United States Patent
Harada et al.

(10) Patent No.: US 7,345,718 B2
(45) Date of Patent: Mar. 18, 2008

(54) DISPLAY DEVICE

(75) Inventors: Takeshi Harada, Shizuoka (JP);
Yoshiyuki Furuya, Shizuoka (JP);
Hideaki Kageyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 334 days.

(21) Appl. No.: 11/239,051

(22) Filed: Sep. 30, 2005

(65) Prior Publication Data
US 2006/0077068 A1  Apr. 13, 2006

(30) Foreign Application Priority Data
Oct. 1, 2004  (JP) ............................. 2004-290308

(51) Int. Cl.
*G02F 1/1335* (2006.01)
(52) U.S. Cl. .................. 349/96; 349/117; 340/815.86; 340/815.75; 340/815.56; 362/23
(58) Field of Classification Search .................. 349/96, 349/117; 340/815.86, 815.75, 815.56; 362/23
See application file for complete search history.

(56) References Cited
U.S. PATENT DOCUMENTS
6,911,238 B2 *  6/2005  Okawa et al. ............... 428/1.1
7,110,064 B2 *  9/2006  Kameda ....................... 349/96
2007/0064168 A1 *  3/2007  Shiraogawa et al. .......... 349/56

FOREIGN PATENT DOCUMENTS
JP            6-885         1/1994
JP          10-301103      11/1998

* cited by examiner

*Primary Examiner*—David Nelms
*Assistant Examiner*—Thanh-Nhan P. Nguyen
(74) *Attorney, Agent, or Firm*—Kratz, Quintos & Hanson, LLP

(57) ABSTRACT

When a polarization axis of a first polarizing plate is parallel to that of a second polarizing plate, a light emitted from a backlight is transmitted, on the other hand, when a polarization axis of the first polarizing plate is orthogonal with that of the second polarizing plate, a light emitted from the backlight is mostly blocked off. A character and scale are constructed by a ½λ phase difference plate, so that the emitted light from the backlight, which enters to the character and scale, has a deflection direction reverse to that of the first polarizing plate. When the light emitted from the backlight is blocked, differently from a conventional artificial (pseudo) black color, a color extremely close to black color is seen. The contrast ratio and visibility are improved.

7 Claims, 13 Drawing Sheets

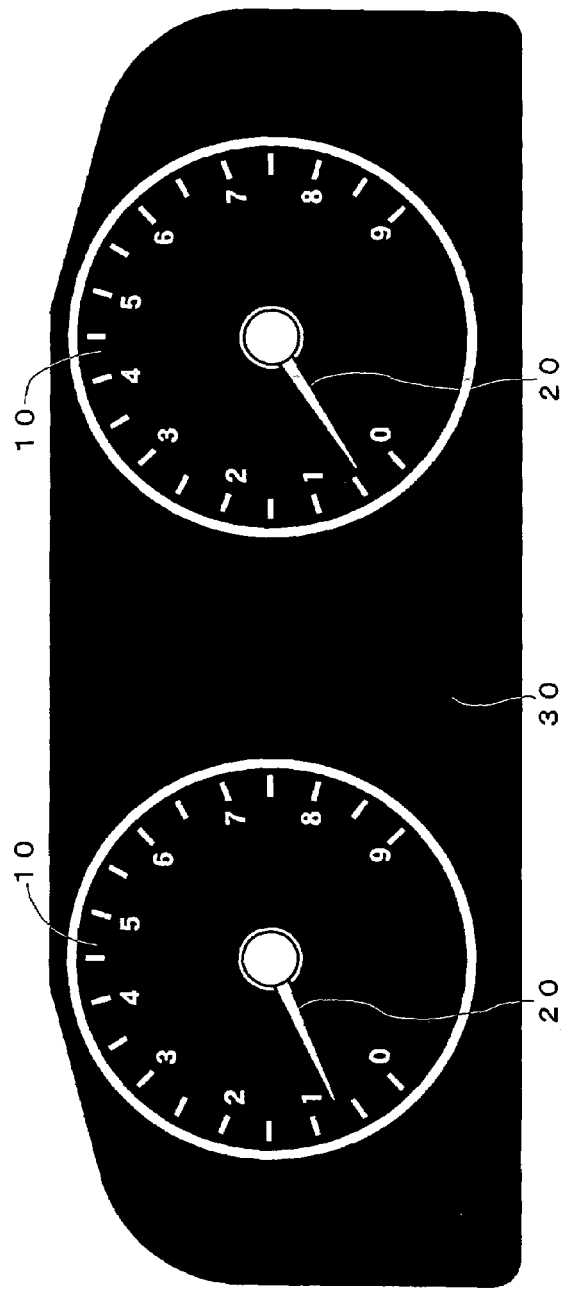
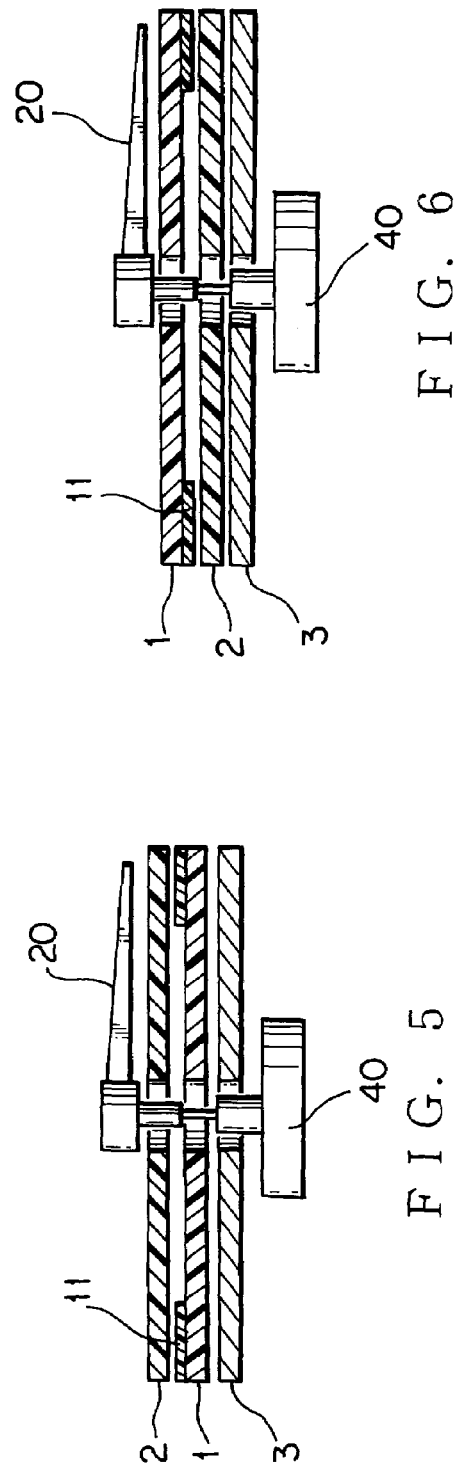

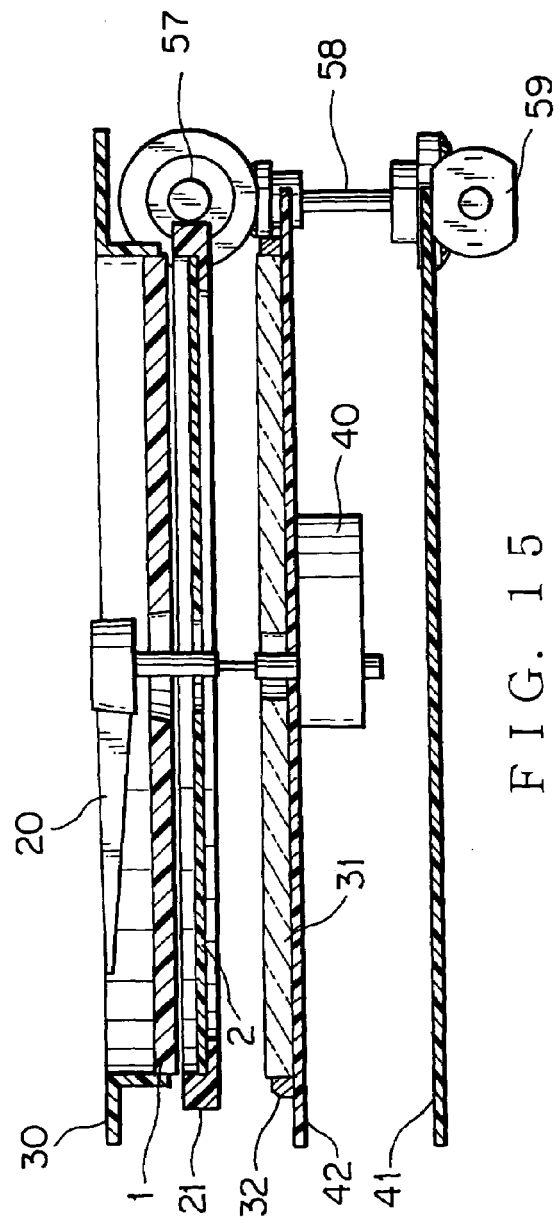
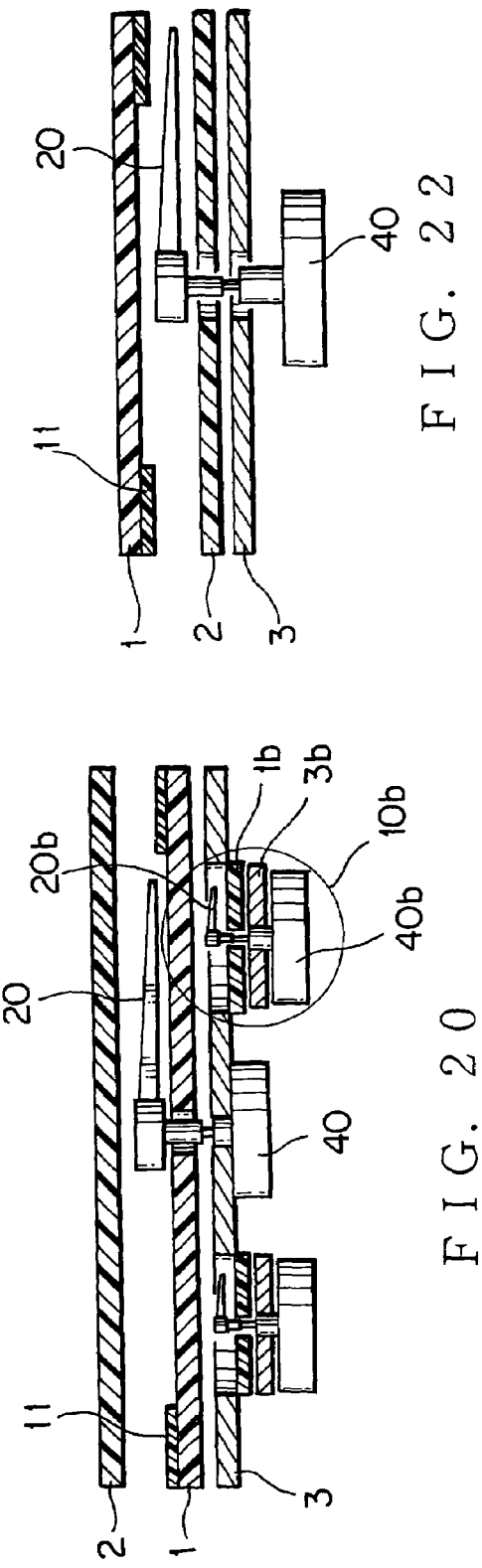

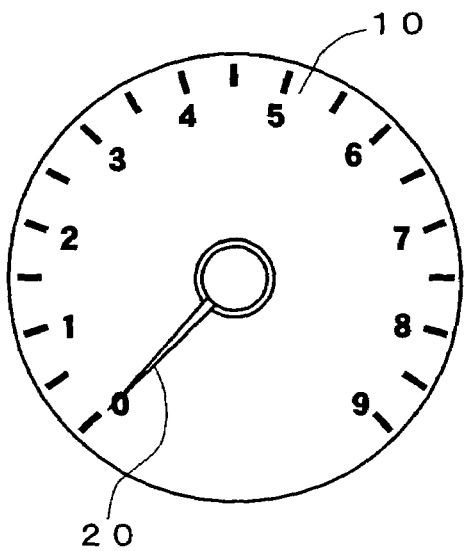 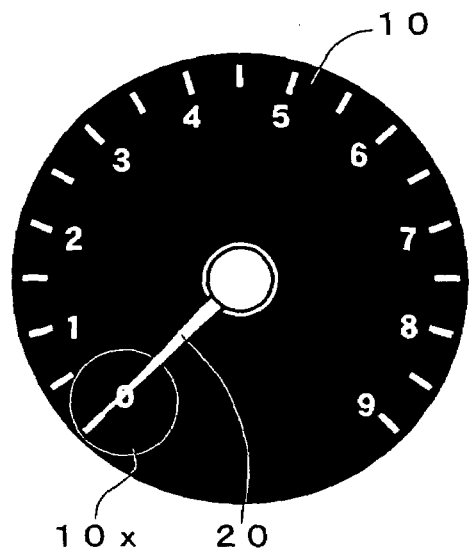
FIG. 23A  FIG. 23B
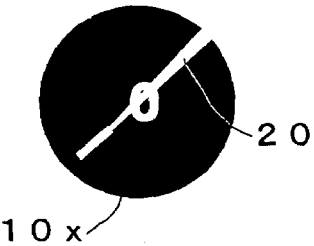
FIG. 23C
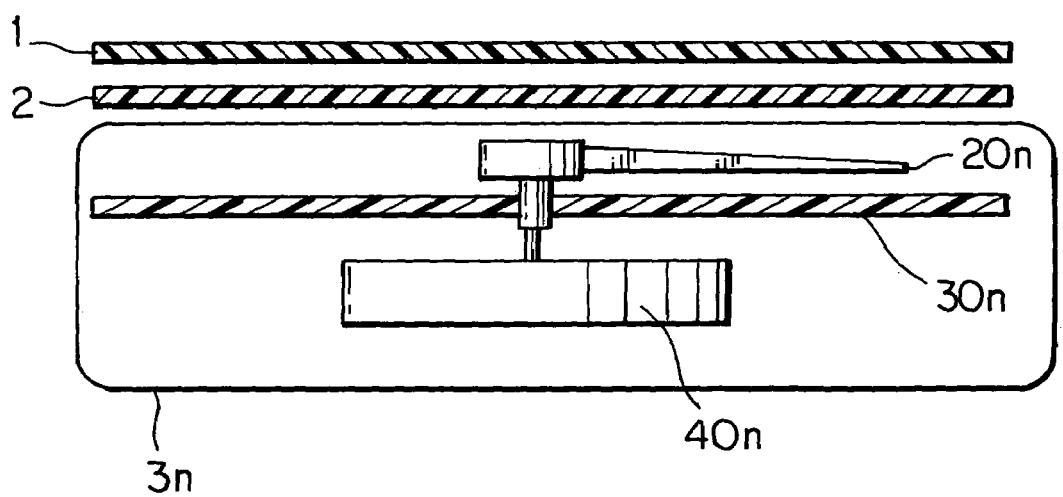
FIG. 24

DISPLAY DEVICE

BACKGROUND OF THE INVENTION (1) Field of the Invention

The present invention relates to a display device and particularly, to a display device in which a polarizing plate and a phase difference plate are combined with each other so as to improve visibility.

(2) Description of the Related Art

So far, in this kind of display device, a so-called white and black-reversible meter has been realized, by which a black character is displayed on a white dial plate in the daytime while a white character is displayed on a black dial plate at night taking the visibility into consideration. FIG. 25 is a front view illustrating a display image in the daytime of such a conventional display device. FIG. 26 is a front view illustrating a display image at night of such a conventional display device.

In this kind of display device, for example, as shown in FIG. 25, a transmission-type character and scale to be indicated by a pointer 92 are formed on a white dial plate 91 exposed from a facing 93.

In the daytime, as shown in FIG. 25, in order to let a character and scale be seen black, an outer periphery of a character and scale is hemmed in black or, alternatively, a smoke plate is entered in a transmission part. At night, since the surroundings becomes dark, as shown in FIG. 26, an illumination is not done with respect to a white dial plate so as to let the dial plate be seen black artificially while a white color illumination is transmitted through a character and scale from the back so as to let the character and scale be seen white.

An example of a conventional display device using a polarizing plate is disclosed in Japanese Utility Model Application Laid-Open No. H6-885 and Japanese Patent Application Laid-Open No. H10-301103.

However, in the daytime, when a strong outer light enters, an illumination part at the back is undesirably seen from the transmission part of the character and scale, which should primarily be seen black. For example, when a diffuser plate having a clouded color is used, the color is seen.

Further, in the twilight, when a backlight is turned on, a white color that is a background color of the dial plate is seen since the surroundings does not become really dark yet. Further, with regard to the character and scale, a white color is transmitted due to the backlight. As a result, in the twilight, the contrast between the character and scale and the dial plate is very low, causing deterioration in the visibility of the character and scale.

Moreover, at night, although the white dial plate is allowed to be seen black artificially, when an outer light enters, as shown with a reference numeral 94 in FIG. 26, a white color that is a background color of the dial plate is seen only in an area where the outer light enters, resulting in that the white character and scale becomes hard to be seen, causing deterioration in the visibility of the character and scale.

SUMMARY OF THE INVENTION

It is therefore an objective of the present invention to solve the above problem and to provide a display device, by which the contrast ratio is improved, so that the visibility is greatly improved.

In order to attain the above objective, the present invention is to provide a display device including:

a backlight constructed by a light source shining with a predetermined color;

a first polarizing plate arranged in front of the backlight, a ½λ phase difference plate for constructing a character and scale being affixed to the first polarizing plate;

a second polarizing plate arranged between the backlight and the first polarizing plate or in front of the first polarizing plate; and polarizing plate controlling means for changing a relation between a polarization axis of the first polarizing plate and that of the second polarizing plate to a parallel relation or orthogonal relation.

With the construction described above, when the polarization axis of the first polarizing plate is parallel to that of the second polarizing plate, a light emitted from the backlight is transmitted, on the other hand, when the polarization axis of the first polarizing plate is orthogonal with (i.e. crossing at right angles with) that of the second polarizing plate, a light emitted from the backlight is mostly blocked off. Since the character and scale are constructed by a ½λ phase difference plate, the emitted light from the backlight, which enters to the character and scale, has a deflection direction reverse to that of the first polarizing plate. In such an action, when the light emitted from the backlight is blocked, differently from a conventional artificial (pseudo) black color, a color extremely close to black color is seen. Therefore, the contrast ratio is improved and the visibility is also greatly improved in both cases of the parallel relation and orthogonal relation of the polarization axes.

Preferably, the first polarizing plate is fixed and the second polarizing plate is changed by the polarizing plate controlling means.

With the construction described above, the first polarizing plate, to which the ½λ phase difference plate for constructing a character and scale is affixed, is fixed and the second polarizing plate is changed by the polarizing plate controlling means. Therefore, in addition to an effect that the contrast ratio is improved and the visibility is also greatly improved in both cases of the parallel relation and orthogonal relation of the polarization axes, the control of the polarizing plate becomes easy.

Preferably, the backlight shines with a white color.

With the construction described above, since the backlight shines with a white color, the contrast ratio with respect to the color extremely close to black color resulting when the emitted light from the backlight is blocked off becomes maximum. Therefore, the visibility is improved.

Preferably, the display device further includes:

a ring-shaped holder for holding the second polarizing plate; and a worm wheel formed on an outer periphery of the holder, wherein the polarizing plate controlling means transmits driving force from a motor as a driving source to a worm gear mating with the worm wheel so as to rotate the holder.

With the construction described above, the driving force from a motor as a driving source is transmitted to the worm gear that mates with the worm wheel, so that the holder rotates. Then, the second polarizing plate is rotated as the holder rotates. When such a mechanism is used, since the deceleration can be increased with the worm gear at the final step and the deceleration with another gear can be decreased, thereby enabling to restrict the number of the gears. Therefore, the construction becomes simple.

Preferably, the display device further includes:

a ring-shaped holder for holding the second polarizing plate; and a holder gear formed on an outer periphery of the holder, wherein the polarizing plate controlling means transmits driving force from a motor as a driving source to an output gear mating with the holder gear so as to rotate the holder.

With the construction described above, the driving force from a motor as a driving source is transmitted to the output gear that mates with the holder gear, so that the holder rotates. Then, the second polarizing plate is rotated as the holder rotates. When such a mechanism is used, the construction becomes simple and a wide use gear can be used, thereby obtaining a cost merit.

Preferably, the display device further includes a third polarizing plate that is smaller than the first polarizing plate, wherein the third polarizing plate is arranged in such a manner that a polarization axis of the third polarizing plate is shifted by 90° with respect to that of the first polarizing plate.

With the construction described above, a chronograph-type meter device can be realized. It becomes possible to make priority and stress with respect to the display.

Preferably, the display device is applied to a multi-meter and a plurality of sets of the first, second and third polarizing plates are provided correspondingly to respective meters included in the multi-meter.

With the construction described above, the visibility can be improved in a combination meter.

BRIEF DESCRIPTION OF THE DRAWINGS

FIG. 2 is a front view illustrating a display image at night of a display device according to the present invention;

FIGS. 5-8 illustrate preferred embodiments when a display device according to the present invention is applied to an on-vehicle meter;

FIG. 15 is a side cross sectional view of the on-vehicle meter shown in FIG. 14;

FIG. 20 is a side cross sectional view illustrating a further preferred embodiment when a display device according to the present invention is applied to an on-vehicle meter;

FIG. 22 is a side cross sectional view illustrating a further preferred embodiment when a display device according to the present invention is applied to an on-vehicle meter;

FIGS. 23A-23C illustrate an action of the preferred embodiment shown in FIG. 22;

FIG. 24 is a side cross sectional view illustrating a further preferred embodiment when a display device according to the present invention is applied to an on-vehicle meter;

DESCRIPTION OF THE PREFERRED EMBODIMENTS

In the following, the preferred embodiments of the present invention will be explained with reference to the attached drawings.

Figure 1:
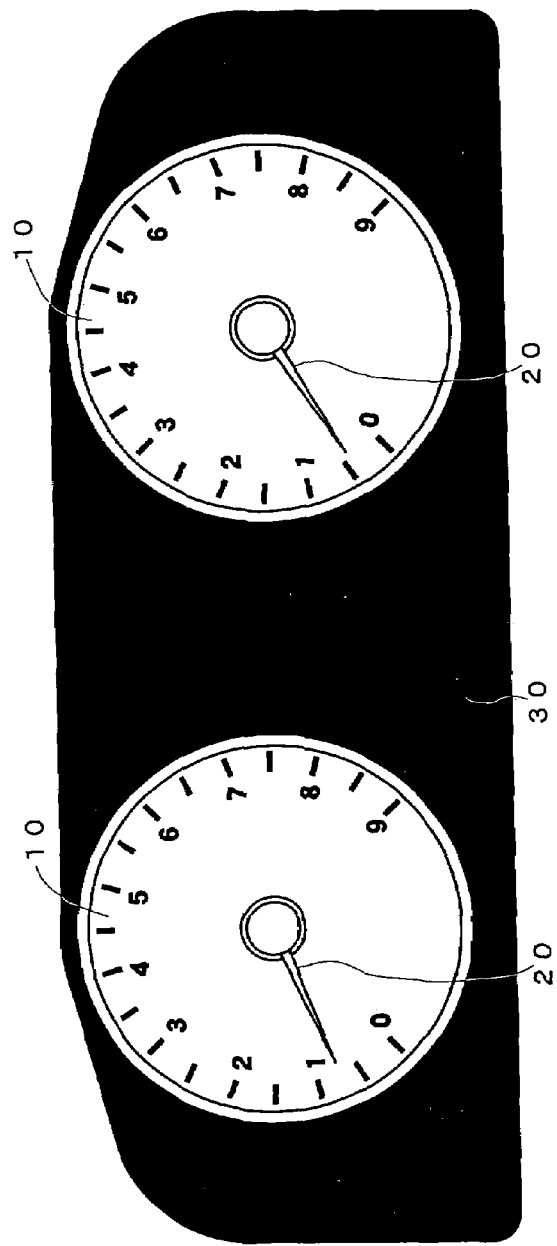
FIG. 1 is a front view illustrating a display image in the daytime of a display device according to the present invention.

FIG. 1 is a front view illustrating a display image in the daytime of a display device according to the present invention. FIG. 2 is a front view illustrating a display image at night of a display device according to the present invention.

In the display device according to the present invention, basically, a black character is displayed on a white dial plate in the daytime, while a white character is displayed on a black dial plate at night. That is, a so-called white and black-reversible meter is realized in a display device according to the present invention. In a display device according to a preferred embodiment, for example, as shown in FIG. 1, a transmission-type character and scale to be indicated by a pointer 20 are formed on a white dial plate 10 exposed from a black facing 30. Here, the "character" includes a numeral.

In the daytime, the surroundings is bright and sometimes a strong outer light may enter into the display device. Therefore, even in a case when a strong outer light may enter thereinto, in order to secure the visibility of the character and scale, the character and scale is made black so as to increase the contrast. Further, the dial plate is made white so as to always secure a certain contrast in the daytime. That is, in the daytime, a black character is seen on a white dial scale.

On the other hand, at night, since the surroundings is dark and the interior of the display device also becomes dark, the character and scale are preferably made white in order to increase the contrast. When a strong outer light enters into the display device, if the dial plate is black, the contrast can be secured. That is, at night, a white character is seen on a black dial scale.

Figure 4B:
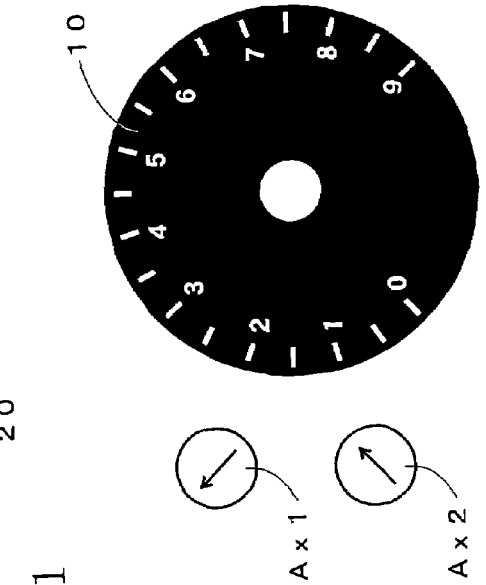
FIGS. 4A and 4B illustrate display images by a display device according to the present invention.
Figure 4A:
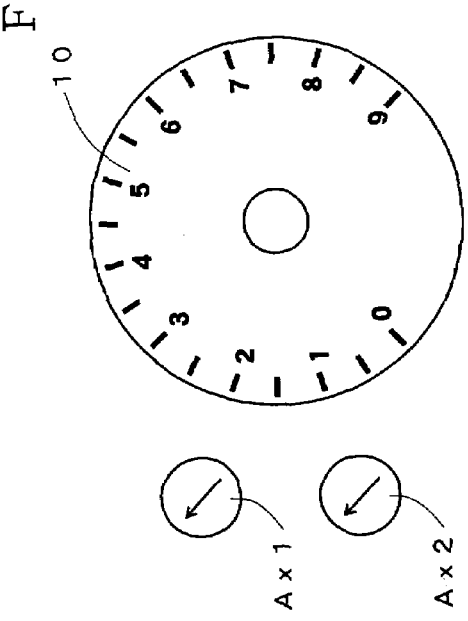
Figure 3A:
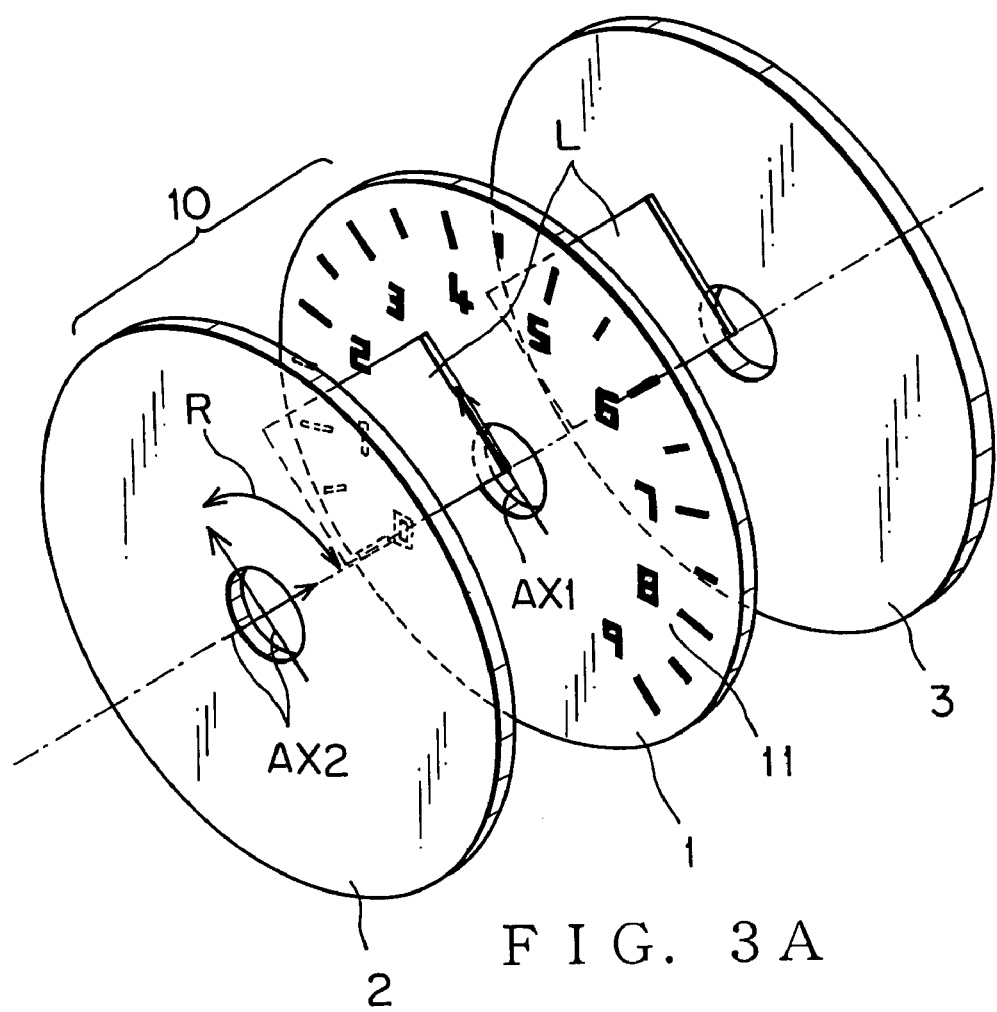
FIGS. 3A and 3B illustrate a principle of a display device according to the present invention.
Figure 3B:
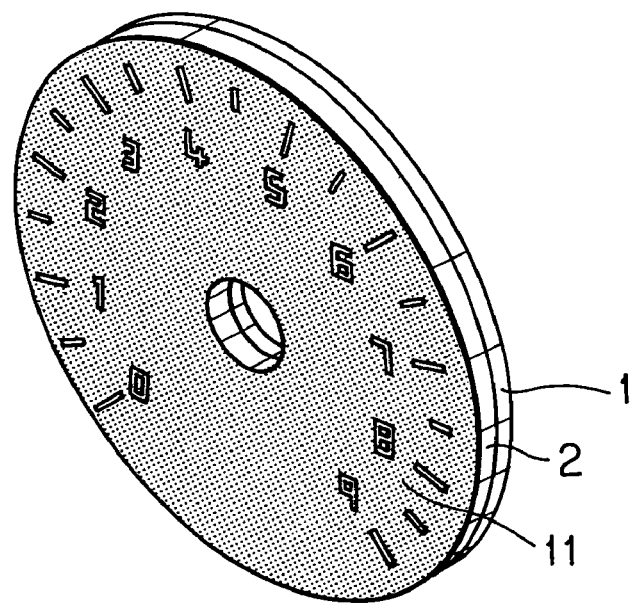

Further, in the display device according to the present invention, the following principle is utilized in order to make the contrast described above be seen very clearly. FIGS. 3A and 3B illustrate the principle of a display device according to the present invention. FIGS. 4A and 4B illustrate display images by a display device according to the present invention.

As shown in FIG. 3A, the display device according to the present invention includes the first polarizing plate 1 and second polarizing plate 2. A ½λ phase difference plate 11 that constructs a character and scale is affixed to the first polarizing plate 1. The ½λ phase difference plate 11 is cut into a shape of the character and scale, and affixed to the first polarizing plate 1, for example, with a double-coated tape, pressure sensitive adhesive or adhesive. A polarization axis AX1 of the first polarizing plate 1 is fixed, while a polarization axis AX2 of the second polarizing plate 2 is rotatable between a state in which the polarization axis AX2 is parallel to the polarization axis AX1 and another state in which the polarization axis AX2 is orthogonal with (i.e. crossing at right angles with) the polarization axis AX1, as shown with an arrow R in FIG. 3A.

When the polarization axis AX2 is parallel to the polarization axis AX1, a light L emitted from a backlight 3 is transmitted, on the other hand, when the polarization axis AX2 is orthogonal with the polarization axis AX1, a light L emitted from the backlight 3 is mostly blocked off. Further, the ½λ phase difference plate 11 can change a deflection direction by matching an orientation axis thereof to a position tilted by 45° from the polarization axis. (For example, P-deflection can be changed to S-deflection.) In the present invention, such a principle is utilized.

In this connection, instead of the preferred embodiment described above, as shown in FIG. 3B, a ½λ phase difference plate 11 placed on a disk sheet having the same shape as that of the first polarizing plate 1 may be affixed to the first polarizing plate 1. In such a ½λ phase difference plate 11, its portions having respective shapes of the character and scale are hollowed out therefrom. In both cases of FIGS. 3A and 3B, a deflection direction of the character and scale is made reverse to that of the plate or disk. Although not shown in FIG. 3B, the second polarizing plate 2 and the backlight 3 are the same as those in FIG. 3A.

In the following, more detailed explanation will be given with reference to FIGS. 4A and 4B and FIGS. 3A and 3B. In FIG. 3A, when the polarization axis AX1 of the first polarizing plate 1 is parallel to the polarization axis AX2 of the second polarizing plate 2, a light L emitted from the backlight 3 is transmitted. Although depending on a material or type of the polarizing plate, for example, the transmission factor (i.e. transmittance) may be about 32%. Since the character and scale are constructed by the ½, phase difference plate 11, the deflection direction of the light L emitted from the backlight 3, which enters to the character and scale, is reversed, so that the light L is mostly blocked off only with respect to the area of the character and scale. Although depending on a material or type of the polarizing plate, for example, the transmission factor may be about 0.1-1%. Therefore, at that time, as shown in FIG. 4A, a black character and scale are displayed on the dial plate 10, through which the light L emitted from the backlight 3 is transmitted. Here, the dial plate 10 is constructed by the first polarizing plate 1 and the second polarizing plate 2. Strictly speaking, the black color (of the character and scale) described above is not a perfect black, however, it is a color extremely close to black color obtained when both polarizing plates are set crossing at right angles with each other (in terms of the relation between their polarization axis). Therefore, hereinafter, such a color extremely close to black color as described above will be simply called "black".

On the other hand, in FIG. 3A, when the polarization axis AX1 of the first polarizing plate 1 crosses at right angles with the polarization axis AX2 of the second polarizing plate 2, the light L emitted from the backlight 3 is transmitted through the character and scale, then blocked by the dial plate 10. Therefore, at that time, as shown in FIG. 4B, the character and scale, through which the light L emitted from the backlight 3 is transmitted, are displayed on the black dial plate 10.

For example, if a white backlight 3 is used, a white and black-reversible dial plate can be realized by changing the relation between the polarization axis of the first polarizing plate 1 and that of the second polarizing plate 2 (i.e. by making the two axes parallel or orthogonal with each other).

In a case when the construction shown in FIG. 3B is used instead of the construction shown in FIG. 3A, the situations of FIG. 4A and FIG. 4B are reversed each other. That is, when the polarization axis AX1 of the first polarizing plate 1 is parallel to the polarization axis AX2 of the second polarizing plate 2, the situation shown in FIG. 4B is realized, on the other hand, when the polarization axis AX1 of the first polarizing plate 1 crosses at right angles with the polarization axis AX2 of the second polarizing plate 2, the situation shown in FIG. 4A is realized.

When the display device of the present invention is to be mounted on a vehicle, it becomes necessary to take a measure for a deflection sunglass. When a polarization axis of the deflection sunglass crosses at right angles with the polarization axis AX2 of the second polarizing plate 2, an image displayed on the dial plate cannot be seen at all. In order to prevent such a problem from occurring, it is necessary to secure a condition that the polarization axis AX2 always never cross at right angles with the polarization axis of the deflection sunglass. Normally, since the polarization axis of the deflection sunglass is perpendicular to a surface of the dial plate, it is preferable to set the polarization axis of the first polarizing plate 1 to be 45° or 135° so as to prevent the polarization axes from crossing at right angles with each other.

With the display device according to the present invention, in which the principle described above is utilized, a color extremely close to black color is seen instead of a conventional artificial (pseudo) black color. Therefore, an excellent visibility with an excellent contrast can be attained. In the display device constructed as described above, when an illumination is carried out from the backlight 3 situated at the back, the transmission factor at the transmission area becomes about 32%, while the transmission-factor at the blocked area becomes about 1%. Therefore, the contrast ratio becomes about 32:1. In this connection, if a ratio of surface reflection when an outer light enters is supposed to be about 5%, the practical contrast ratio becomes about 37:6. Therefore, as a measure for the above, it is preferable to have a nonreflective processing such as AR coating or the like with respect to the surface.

In the following, a preferred embodiment when the display device according to the present invention is applied to an on-vehicle meter will be explained with reference to FIGS. 5-8. FIGS. 5-8 illustrate preferred embodiments when a display device according to the present invention is applied to an on-vehicle meter. FIGS. 5-8 are side cross sectional views.

As described above, in the display device according to the present invention, since the polarization axis AX2 is changed, therefore the second polarizing plate 2 has to be changed. However, the positional relation in a front-and-behind direction between the first polarizing plate 1 and the second polarizing plate 2 does not a matter because of the principle described above. The second polarizing plate 2, to which the ½λ phase difference plate 11 is not affixed, is rotated.

Figure 7:
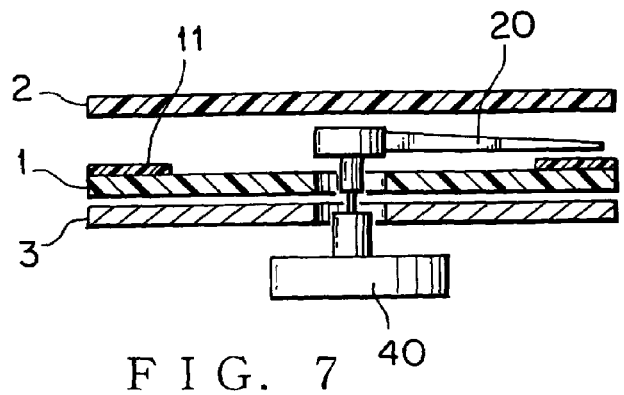
Figure 8:
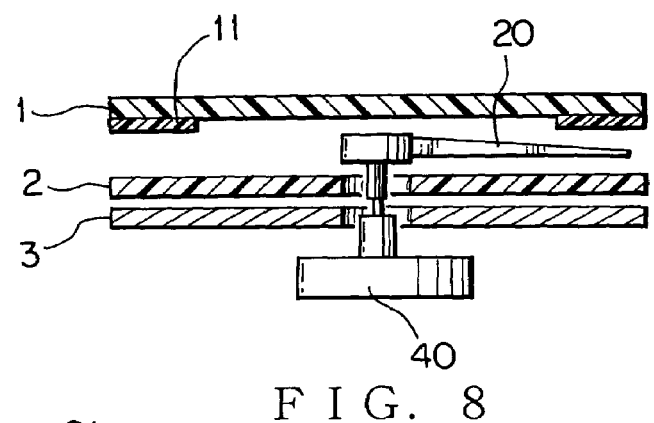

Taking the above point into consideration, as shown in FIGS. 5 and 6, the positional relation in a front-and-behind direction between the first polarizing plate 1 and the second polarizing plate 2 is optional. In the figures, the upward direction corresponds to the forward direction. Further, as shown in FIGS. 7 and 8, a pointer 20 may be arranged between the first polarizing plate 1 and the second polarizing plate 2, which are arranged in an optional positional relation in the front-and-behind direction between the two. The reference numeral 3 denotes the backlight. The reference numeral 40 denotes a motor for rotating the pointer 20.

In FIGS. 5-8, if the backlight 3 is always turned on in a white color, a display of a white dial plate and black character in the daytime and a display of a black dial plate and white character at night, each display having an excellent contrast ratio, can be realized. Taking an occasion when the white character might be too dazzling at night into consideration, preferably, the backlight may be set in such a manner that the brightness of the illumination from the backlight can be decreased compared to that of the illumination in the daytime. Likewise, taking an occasion when the white dial plate might be too dazzling in the daytime into consideration, preferably, the backlight may be set in such a manner that the brightness of the illumination from the backlight can be decreased. Further, taking an occasion when the backlight might be too dark into consideration, more preferably, the backlight may be set in such a manner that the brightness of the illumination from the backlight can be increased. Preferably, the rotation of the second polarizing plate 2 may be carried out synchronously with an on/off operation of lamps. This method may also be the case in the following embodiments.

Figure 10A:
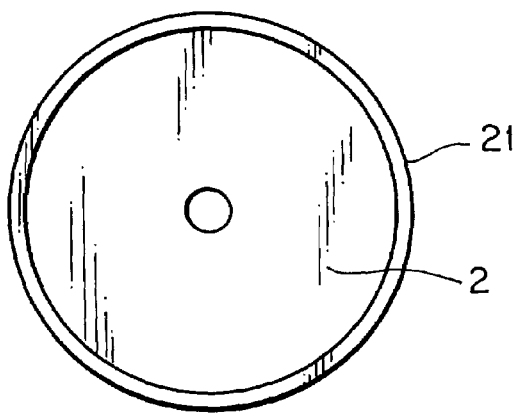
FIGS. 10A and 10B are a front view and perspective view, respectively, illustrating a construction of the second polarizing plate according to a preferred embodiment of a display device of the present invention.
Figure 9:
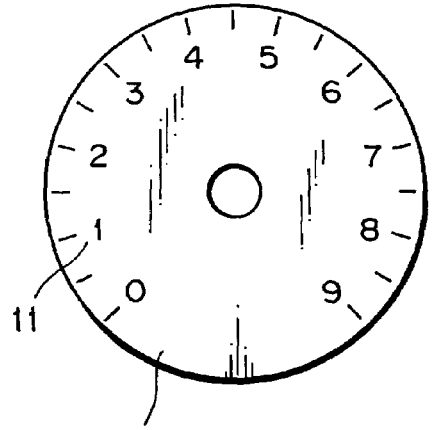
FIG. 9 is a front view illustrating a construction of the first polarizing plate according to a preferred embodiment of a display device of the present invention.
Figure 10B:
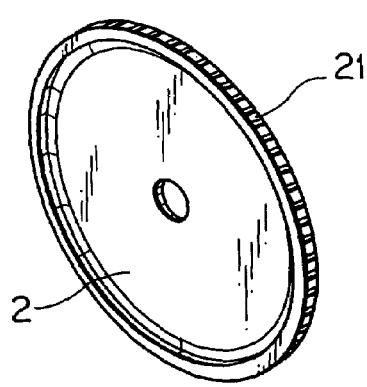
Figure 11:
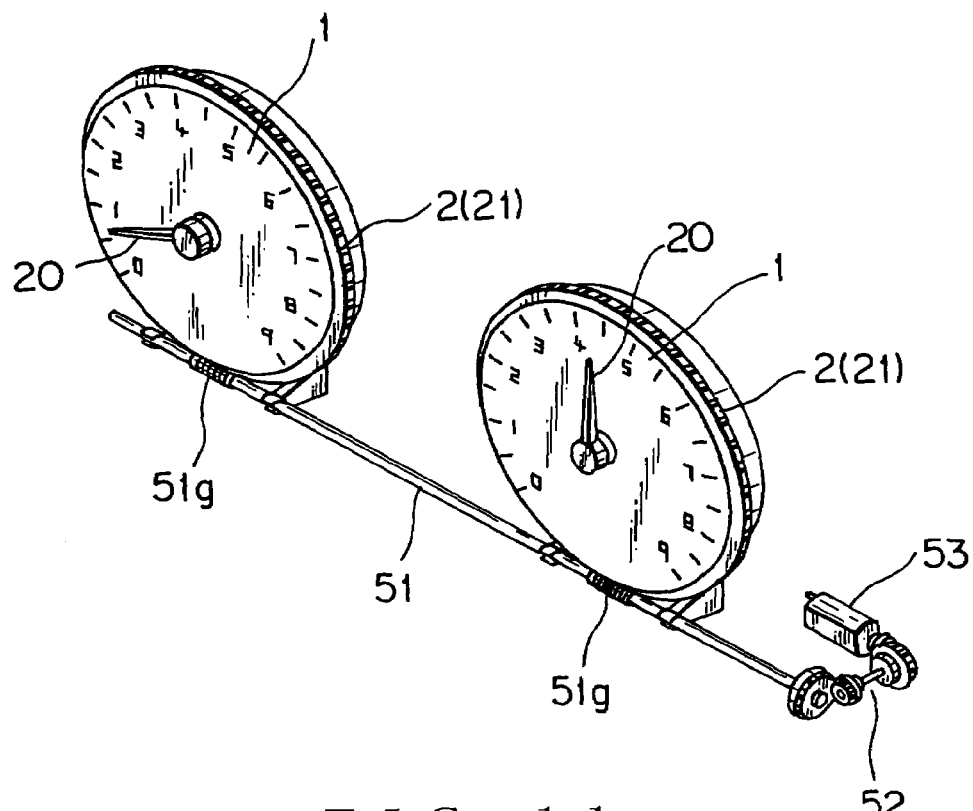
FIG. 11 is a perspective view illustrating a polarizing plate driving mechanism according to a preferred embodiment of a display device of the present invention.
Figure 12:
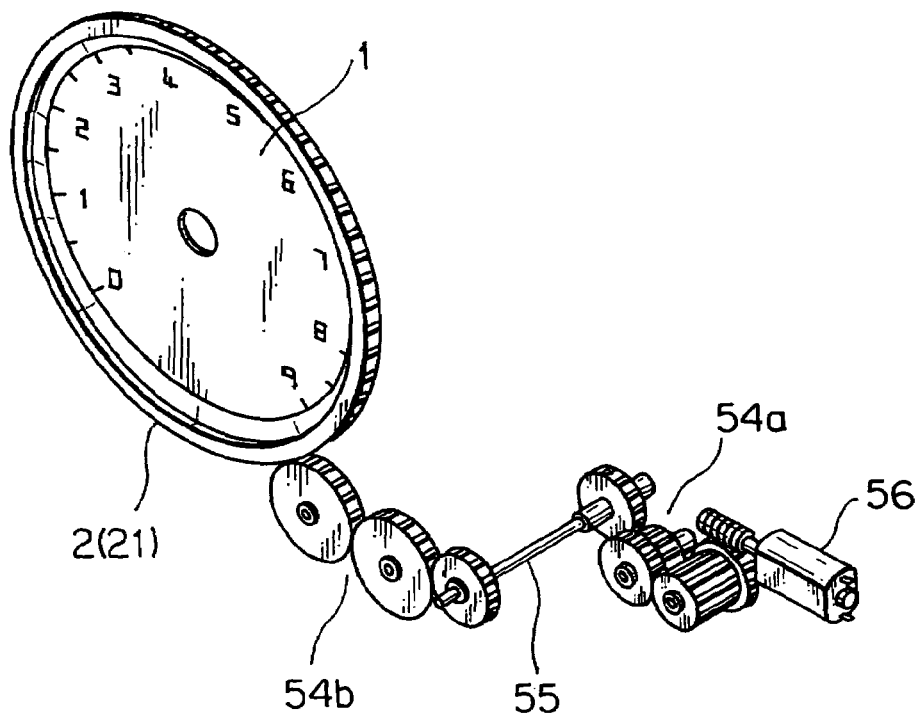
FIG. 12 is a perspective view illustrating another polarizing plate driving mechanism according to a preferred embodiment of a display device of the present invention.
Figure 13:
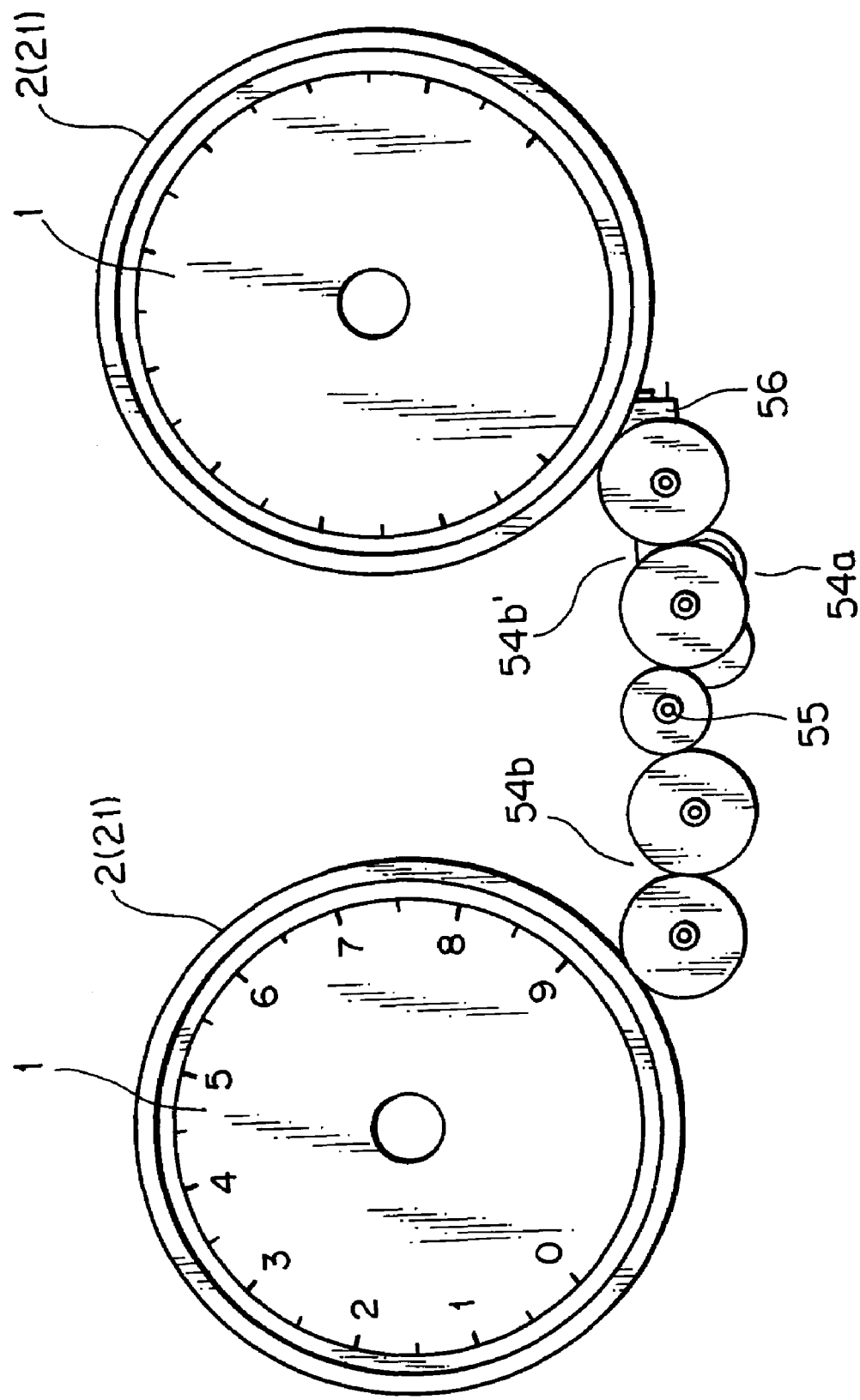
FIG. 13 is a front view illustrating a preferred embodiment which extends the preferred embodiment shown in FIG. 12.
Figure 14:
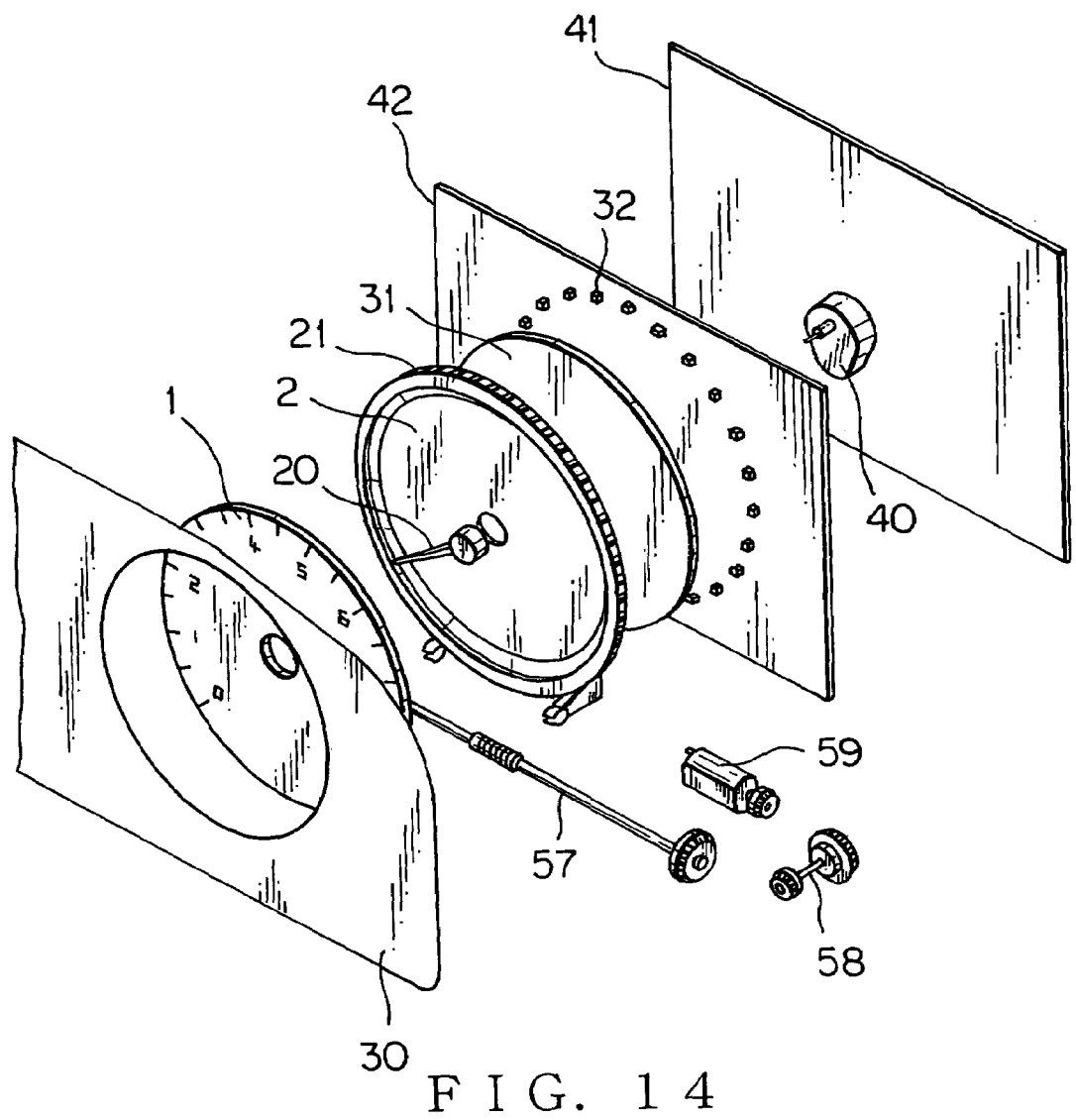
FIG. 14 is an exploded perspective view illustrating a construction when the polarizing plate driving mechanism of a type shown in FIG. 11 is applied to an on-vehicle meter.

In the following, a preferred embodiment when the display device according to the present invention is applied to an on-vehicle meter will be explained in more detail with reference to FIGS. 9-15. FIG. 9 is a front view illustrating a construction of the first polarizing plate according to a preferred embodiment of a display device of the present invention. FIGS. 10A and 10B are a front view and perspective view, respectively, illustrating a construction of the second polarizing plate according to a preferred embodiment of a display device f the present invention. FIG. 11 is a perspective view illustrating a polarizing plate driving mechanism according to a preferred embodiment of a display device of the present invention. FIG. 12 is a perspective view illustrating another polarizing plate driving mechanism according to a preferred embodiment of a display device of the present invention. FIG. 13 is a front view illustrating a preferred embodiment which extends the preferred embodiment shown in FIG. 12. FIG. 14 is an exploded perspective view illustrating a construction when the polarizing plate driving mechanism of a type shown in FIG. 11 is applied to an on-vehicle meter. FIG. 15 is a side cross sectional view of the on-vehicle meter shown in FIG. 14.

As shown in FIG. 9, the ½λ phase difference plate 11 that constructs the character and scale is affixed to the first polarizing plate 1. As already explained with reference to FIG. 3A, the ½% phase difference plate 11 is cut into a shape of the character and scale, and affixed to the first polarizing plate 1, for example, with a double-coated tape, pressure sensitive adhesive or adhesive. As already explained with reference to FIG. 3B, the portions having respective shapes of the character and scale may be hollowed out therefrom.

As shown in FIGS. 10A and 10B, the second polarizing plate 2 is held by a ring-shaped holder 21. This is because the second polarizing plate 2 has to be rotated but it is difficult to form a gear and stopper on the second polarizing plate 2 itself. Therefore, a gear and stopper are formed on the ring-shaped holder 21 so as to rotate the second polarizing plate 2 together with the holder 21.

The first polarizing plate 1 and the second polarizing plate 2 constructed as described above is embodied as a polarizing plate driving mechanism using a worm gear 51 as shown in FIG. 11. Here, as shown in FIG. 11, for example, a two-meter corresponding to a speedometer and tachometer is assumed. The first polarizing plate 1 and the second polarizing plate 2 having the construction explained with reference to FIGS. 9 and 10 are combined with each other, and as shown in FIG. 11 the pointer 20 is attached thereto.

In FIG. 11, the power of a motor 53 is transmitted to a main shaft 51 through a connecting shaft 52 having a bevel gear. At that time, the speed is decreased, if necessary. A worm gear 51g is arranged on the main shaft 51 and the gear is formed so that the holder 21 becomes a worm wheel. With this construction, the power of the motor 53 can rotate the second polarizing plate 2. By using this mechanism, the deceleration can be increased with the worm gear at the final step and the deceleration with another gear can be decreased, thereby enabling to restrict the number of the gears.

Since this is a two-meter, the two worm gears are arranged on the main shaft 51 and two second polarizing plates 2 having the same structure, which correspond to the two-meter, are rotated synchronously. In order to synchronize the rotation speed, the two holders 21 for constructing the worm wheel and a pertinent module are made common. Since the worm gear is moved by the same main shaft with one motor, there is no problem occurring with respect to the synchronism. The same mechanism can be applied to a multi-meter besides a two-meter.

The first polarizing plate 1 and the second polarizing plate 2 may be embodied as a polarizing plate driving mechanism using a spur gear as shown in FIG. 12. In FIG. 12, the power of a motor 56 is transmitted to the holder 21 through a gear 54a, connecting shaft 55 and gear 54b. The power of the motor 56 is decelerated by the gear 54a and so on so as to obtain an appropriate number of revolution and torque. An outer periphery of the holder 21 is provided with a gear (i.e. holder gear) mating with the gear 54b (i.e. output gear). With the construction described above, the structure becomes simple and a general gear can be used, so that the cost can be reduced.

In case of a two-meter, as shown in FIG. 13, the power from the connecting shaft 55 shown in FIG. 12 is distributed by gears 54b and 54b', thereby enabling to synchronously rotate two second polarizing plates 2 having the same structure corresponding to the two-meter. In FIG. 13, the power of the motor is distributed at the center, however, in case of the gears, since the degree of freedom for the arrangement is comparatively high, therefore the position of each gear can be changed. The same driving mechanism can be used in a case of a multi-meter besides the two-meter. The driving mechanism may be a mechanism of a type other than the type in which a worm wheel or spur gear is used.

As shown in FIGS. 14 and 15, the polarizing plate driving mechanism of the worm gear type shown in FIG. 11 can be mounted in an on-vehicle meter. In FIGS. 14 and 15, a motor 59 (not shown in FIG. 14) for rotating the second polarizing plate 2 is mounted on a base plate 41. A motor 40 (not shown in FIG. 14) for rotating the pointer 20, a light source 32 (for example, LED) as the backlight and light guiding plate 31 for light-guiding the emitted light from the light source 32 are mounted on a base plate 42.

The power of the motor 59 is transmitted to the holder 21 through a connecting shaft 58 and main shaft 57. The holder 21 holds the second polarizing plate 2. The first polarizing plate 1 is piled on the holder 21. The facing 30 is further piled thereon and a shaft of the pointer 20 is inserted through a rotation shaft of the motor 40. The second polarizing plate 2 rotates together with the holder 21, on the other hand, the first polarizing plate 1 is fixed so as not to rotate. A construction for a multi-meter is the same as that for the two-meter. A basic construction for a type of gear driving is the same as that shown above except a point that the construction of the driving system is replaced by the construction shown in FIGS. 14 and 15.

Figure 18:
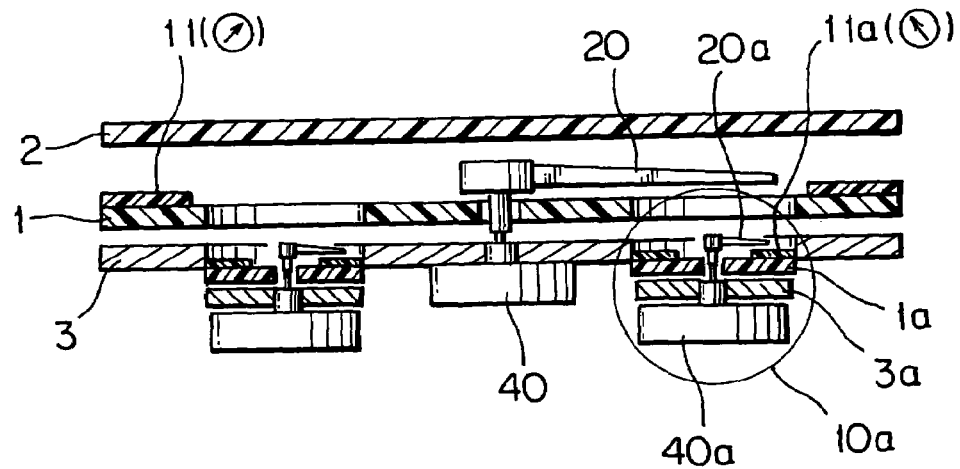
FIG. 18 is a side cross sectional view of the display device according to the preferred embodiment shown in FIG. 17.
Figure 16:
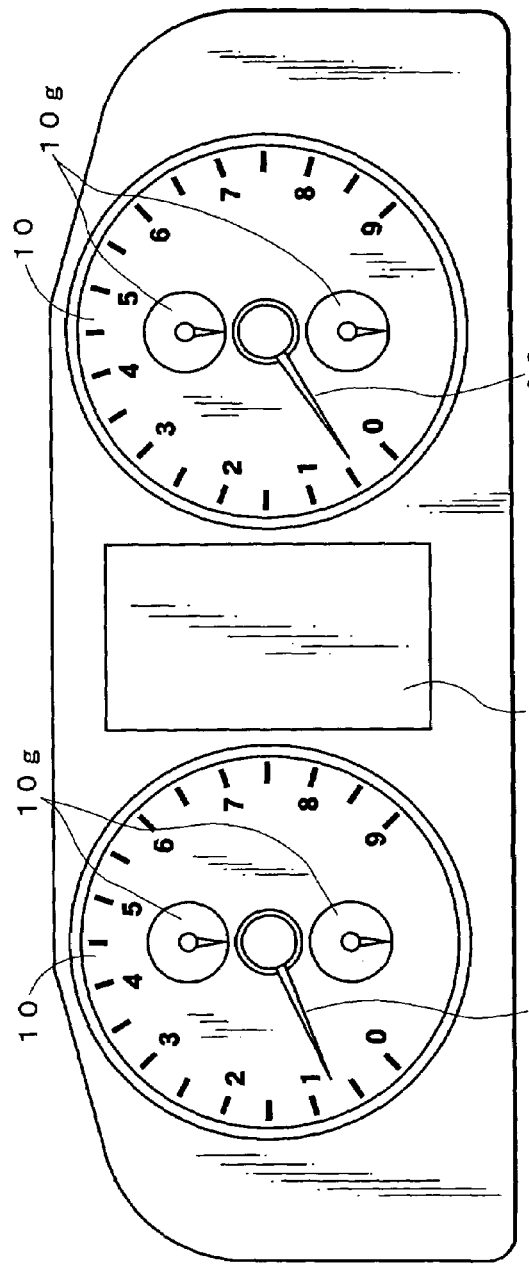
FIG. 16 is a front view illustrating another preferred embodiment when a display device according to the present invention is applied to an on-vehicle meter.
Figure 19A:
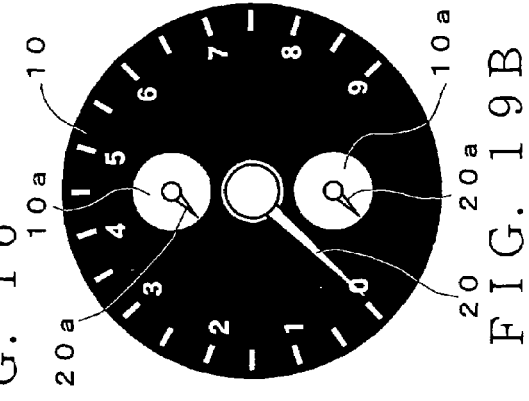
FIGS. 19A and 19B illustrate an action of the preferred embodiment shown in FIG. 17.
Figure 19B:
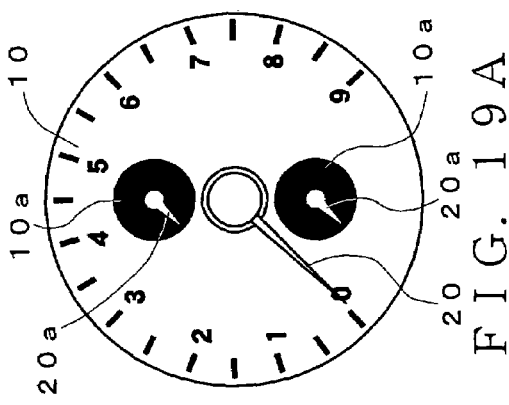
Figure 17:
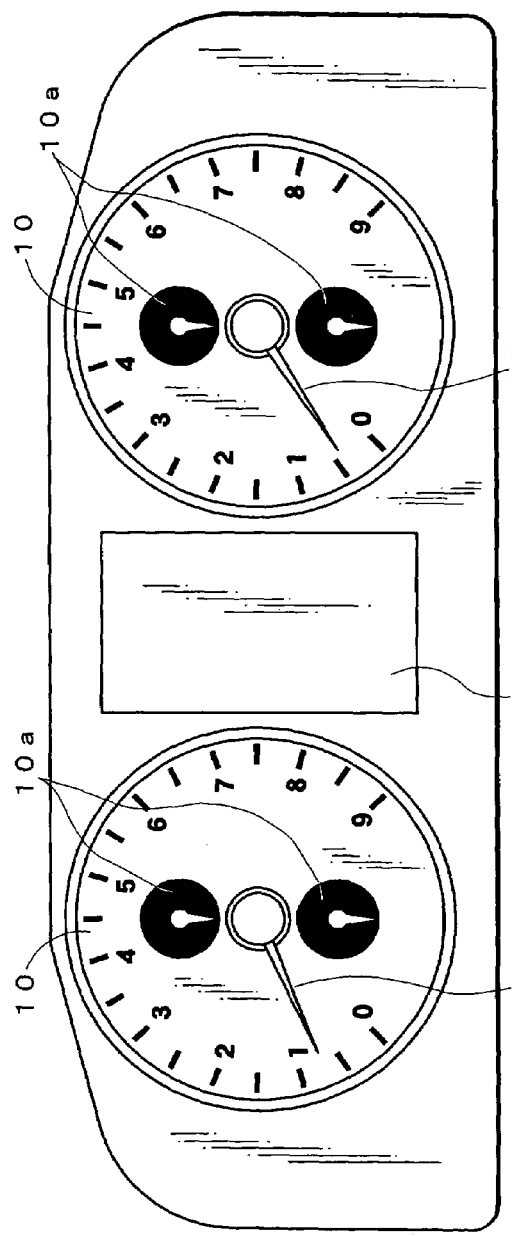
FIG. 17 is a front view illustrating a further preferred embodiment when a display device according to the present invention is applied to an on-vehicle meter.
Figure 21B:
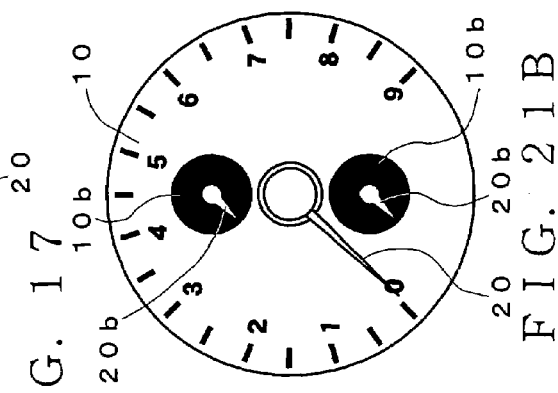
FIGS. 21A and 21B illustrate an action of the preferred embodiment shown in FIG. 20.
Figure 21A:
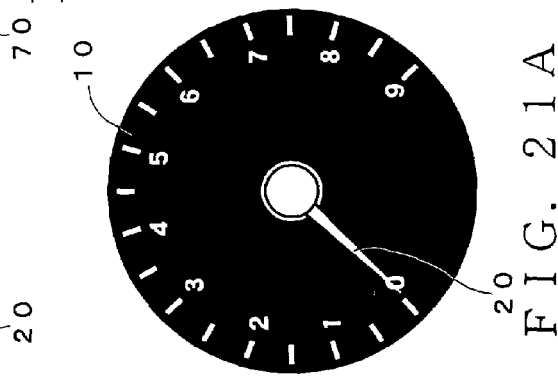
Figure 25:
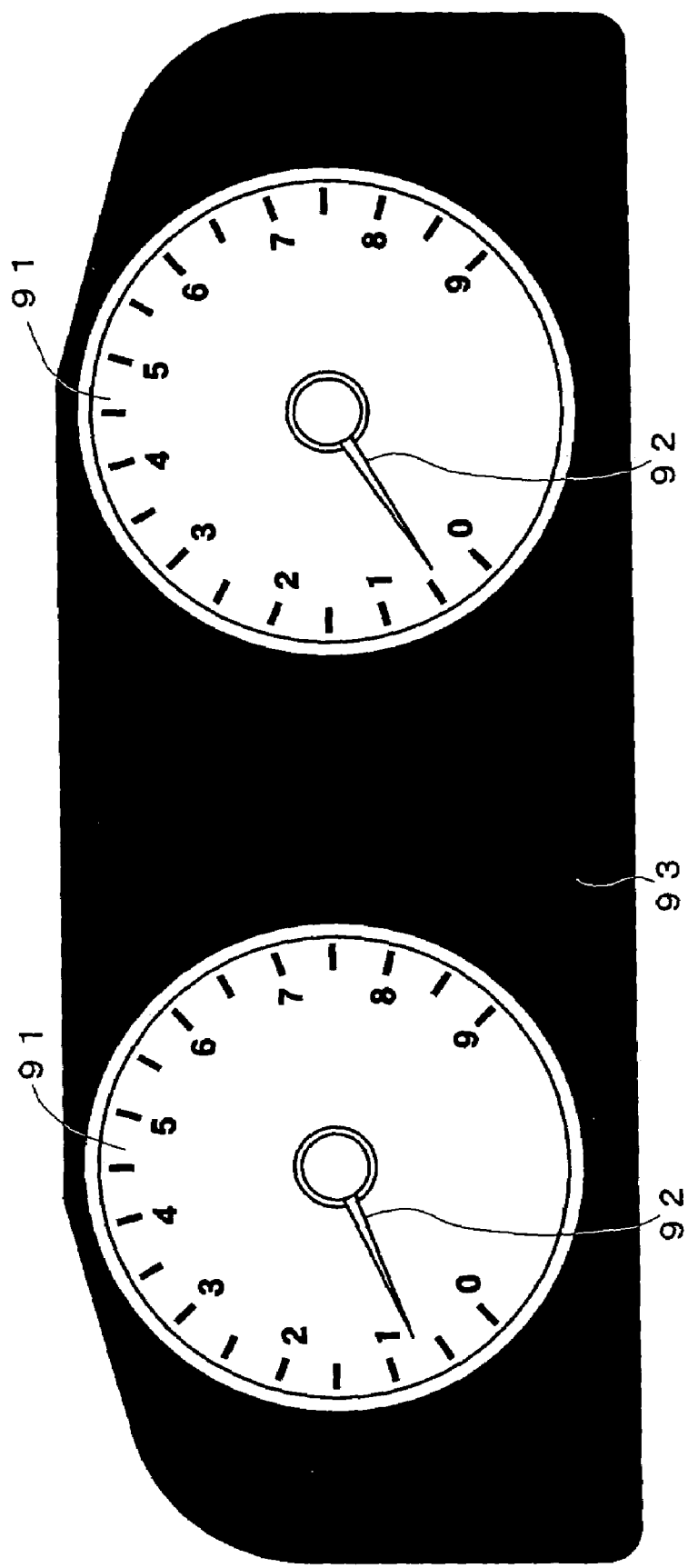
FIG. 25 is a front view illustrating a display image in the daytime of a conventional display device.
Figure 26:
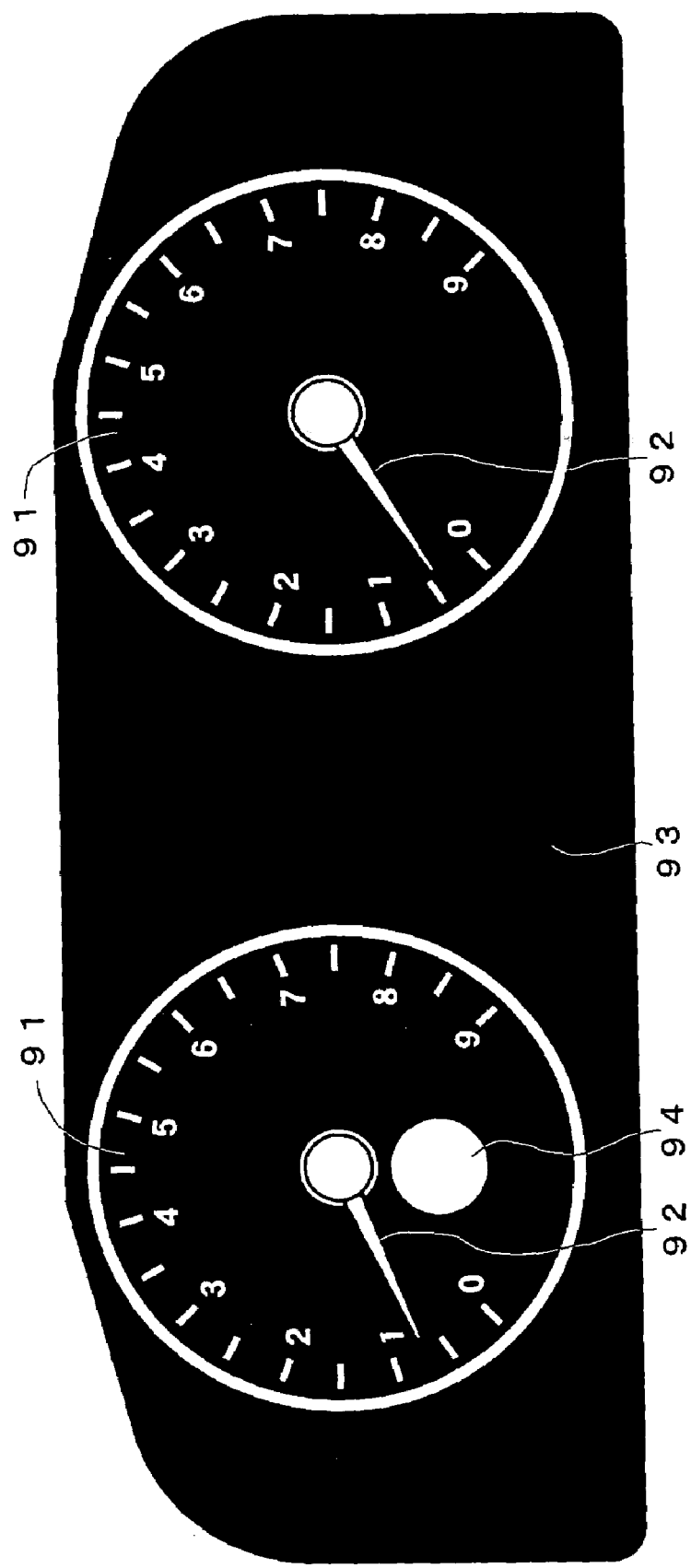
FIG. 26 is a front view illustrating a display image at night of a conventional display device.

In the following, a further preferred embodiment when the display device according to the present invention is applied to an on-vehicle meter will be explained with reference to FIGS. 16-24. FIG. 16 is a front view illustrating another preferred embodiment when a display device according to the present invention is applied to an on-vehicle meter. FIG. 17 is a front view illustrating a further preferred embodiment when a display device according to the present invention is applied to an on-vehicle meter. FIG. 18 is a side cross sectional view of the display device according to the preferred embodiment shown in FIG. 17. FIGS. 19A and 19B illustrate an action of the preferred embodiment shown in FIG. 17. FIG. 20 is a side cross sectional view illustrating a further preferred embodiment when a display device according to the present invention is applied to an on-vehicle meter. FIGS. 21A and 21B illustrate an action of the preferred embodiment shown in FIG. 20. FIG. 22 is a side cross sectional view illustrating a further preferred embodiment when a display device according to the present invention is applied to an on-vehicle meter. FIGS. 23A-23C illustrate an action of the preferred embodiment shown in FIG. 22. FIG. 24 is a side cross sectional view illustrating a further preferred embodiment when a display device according to the present invention is applied to an on-vehicle meter.

As shown in FIG. 16, a display device according to the present invention can be applied to a speed meter or tachometer of an on-vehicle meter (combination meter). Since the driving mechanism needs less space and there is no component around the center of the on-vehicle meter other than the shaft, therefore it becomes possible to arrange a display 70 such as a LCD near the center. Further, as shown in FIG. 16, a display device according to the present invention can be applied to a gauge 10g besides the dial plate 10 to be indicated by the pointer 20. That is, a display device according to the present invention can be applied to a chronograph-type on-vehicle meter. Of course, as shown in FIG. 16, the gauge 10g may be combined with the display 70.

Further, as shown in FIGS. 17 and 18, in a chronograph-type form, the polarization axis of the first polarizing plate 1a (i.e. the polarizing plate on which a character and scale are formed, the polarizing plate being not rotated) of the gauge 10a may be set to be shifted by 90° from the polarization axis AX1 of the first polarizing plate 1 that constructs the dial plate 10. The first polarizing plate 1a is the third polarizing plate in the claims. As shown in FIG. 18, the gauge 10a includes the pointer 20, first polarizing plate 1, pointer 20a which is smaller than the backlight 3, first polarizing plate 1a, backlight 3a, and motor 40a. A $\frac{1}{2}\lambda$ phase difference plate 11a for constructing a character and scale is affixed to the first polarizing plate 1a as well. The second polarizing plate 2 is used with respect to the first polarizing plate 1 and the first polarizing plate 1a in common.

In the construction described above, as shown in FIGS. 19A and 19B, the white-black inversion in the daytime and at night is carried out on a condition that the gauge 10a and dial plate 10 are white-black inversed. This is because the condition of the respective polarization axes of the first polarizing plate 1 and the first polarizing plate 1a is reversed. As a result, it becomes possible to make priority and stress with respect to the display. The gauge 10a may be arranged outside the dial plate 10. The gauge 10a can be applied to a multi-meter.

Further, as shown in FIGS. 20, 21A and 21B, in a chronograph-type form, the gauge 10b may be set to be seen only when the polarization axis of the first polarizing plate is parallel to that of the second polarizing plate 2, that is, only when the dial plate surface is in a transmission condition. For this purpose, the gauge 10b, which is equivalent to a normal meter, includes a small pointer 20b, gauge plate 1b, backlight 3b and motor 40b. A color of the gauge plate 1b is optional since the gauge 10b is equivalent to a normal meter. As a result, the display and non-display of the gauge 10b can be carried out in line with the white-black inversion of the dial plate 10. The embodiment shown in FIG. 20 can be applied to a multi-meter.

As shown in FIG. 22, the pointer 20 may be arranged between the first polarizing plate 1 to which a $\frac{1}{2}\lambda$ phase difference plate 11 for constructing a character and scale is affixed and the second polarizing plate 2. With this construction, as shown in FIGS. 23A-23C, the character and scale is always seen being transmitted through the first polarizing plate 1 not depending on a condition of the second polarizing plate 2. In particular, at a portion indicated by the pointer 20, a color of the pointer 20 is seen through, that is, the character and scale are seen with the color being changed only for the portion. Since the character and scale are parted from the pointer 20, therefore it becomes possible to give a stereognostic sense or an impression different from a conventional one.

Further, a display device according to the present invention can be applied to an on-vehicle meter (black-facing meter) as shown in FIG. 24. That is, a smoke plate is used for a front glass so that the contrast of the display is improved and that the pointer of the meter and the character and scale on the dial plate are not to be seen. However, since it is difficult to make the brightness of the meter illumination high, therefore there is a limit in reducing the transmission factor (i.e. transmittance). That is, when an outer light is entered, the pointer of the meter and the character and scale are seen. In particular, when a display illumination is turned off upon stopping of a vehicle, if the pointer of the meter and the character and scale are seen, it looks unattractive.

In order to solve the above problem, as shown in FIG. 24, the first polarizing plate 1 and the second polarizing plate 2 are attached on a front face of a normal meter 3n, which includes a pointer 20n, a dial plate 30n on which a character and scale are formed, and motor 40n. Then, the polarization axis of the first polarizing plate 1 is set to cross at right angles with that of the second polarizing plate 2, so that the pointer of the meter and the character and scale are set almost never to be seen. Upon travelling of a vehicle, one of the first polarizing plate 1 and the second polarizing plate 2 is rotated, so that the polarization axis of the first polarizing plate 1 is set parallel to that of the second polarizing plate 2. Since the polarizing plate has a function to reduce a transmission factor as well as a smoke plate, an effect which is the same as that of the black-facing meter as described above can be attained.

As explained above, according to the present invention, a display device, by which the contrast ratio is improved so that the visibility is greatly improved, can be provided.

A display device according to the present invention can be applied to other meters besides an on-vehicle meter.

The aforementioned preferred embodiments are described to aid in understanding the present invention and variations may be made by one skilled in the art without departing from the spirit and scope of the present invention.

What is claimed is:

1. A display device comprising:
   a backlight constructed by a light source shining with a predetermined color;
   a first polarizing plate arranged in front of the backlight, a ½λ phase difference plate for constructing a character and scale being affixed to the first polarizing plate;
   a second polarizing plate arranged between the backlight and the first polarizing plate or in front of the first polarizing plate; and
   polarizing plate controlling means for changing a relation between a polarization axis of the first polarizing plate and that of the second polarizing plate to a parallel relation or orthogonal relation.

2. The display device according to claim 1, wherein the first polarizing plate is fixed and the second polarizing plate is changed by the polarizing plate controlling means.

3. The display device according to claim 2, wherein the backlight shines with a white color.

4. The display device according to claim 1 further comprising:
   a ring-shaped holder for holding the second polarizing plate; and
   a worm wheel formed on an outer periphery of the holder, wherein the polarizing plate controlling means transmits driving force from a motor as a driving source to a worm gear mating with the worm wheel so as to rotate the holder.

5. The display device according to claim 1 further comprising:
   a ring-shaped holder for holding the second polarizing plate; and
   a holder gear formed on an outer periphery of the holder, wherein the polarizing plate controlling means transmits driving force from a motor as a driving source to an output gear mating with the holder gear so as to rotate the holder.

6. The display device according to claim 1 further comprising a third polarizing plate that is smaller than the first polarizing plate, wherein the third polarizing plate is arranged in such a manner that a polarization axis of the third polarizing plate is shifted by 90° with respect to that of the first polarizing plate.

7. The display device according to claim 6, wherein the display device is applied to a multi-meter and a plurality of sets of the first, second and third polarizing plates are provided correspondingly to respective meters included in the multi-meter.

* * * * *